United States Patent [19]
Tawa

[11] Patent Number: 5,943,342
[45] Date of Patent: Aug. 24, 1999

[54] DIGITAL TRANSMISSION EQUIPMENT

[75] Inventor: Shoji Tawa, Kawasaki, Japan

[73] Assignee: Fujitsu Limited, Kanagawa, Japan

[21] Appl. No.: 08/819,729

[22] Filed: Mar. 18, 1997

[30] Foreign Application Priority Data

Jul. 19, 1996 [JP] Japan .................................. 8-190216

[51] Int. Cl.⁶ ...................................................... H04J 3/16
[52] U.S. Cl. ............................................ 370/466; 370/465
[58] Field of Search ..................................... 370/227, 228,
370/225, 226, 537, 538, 321, 535, 465,
466, 338

[56] References Cited

U.S. PATENT DOCUMENTS 5,748,619  5/1998  Meier ........................................ 370/278
5,878,045  3/1999  Timbs ...................................... 370/466

Primary Examiner—Jeffery A. Hofsass
Assistant Examiner—Mitchell Slavitt
Attorney, Agent, or Firm—Helgott & Karas, P.C.

[57] ABSTRACT

A digital transmission equipment comprising an interface apparatus connected through a wired line between a transmitter-receiver which transfers a digital signal through a wireless communication link and a multiplexer connected to a terminal equipment. The interface apparatus communicates with a multiplexer with the I-interface frame format and communicates with an interface apparatus opposed through a transmitter-receiver by the frame format in which a synchronization bit string in this frame format is allocated to service information bits for a wireless communication link. Without changing a basic format of the I-interface signal from the multiplexer, the service information bit peculiar to the wired line can be arranged in the frame format.

10 Claims, 12 Drawing Sheets

F I G. 4
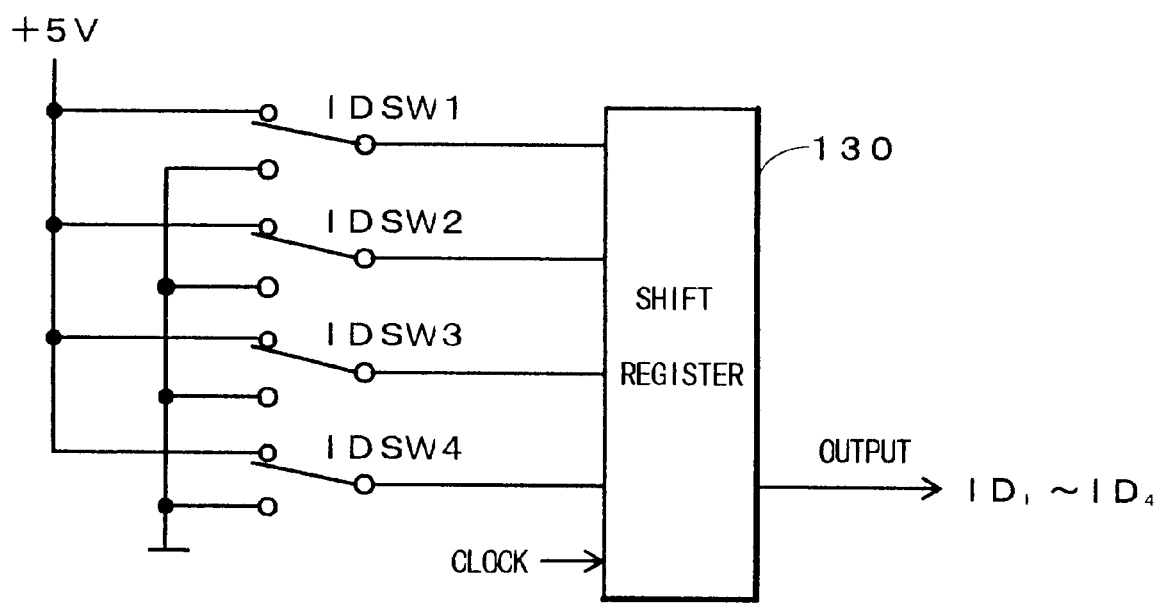

FIG. 5

| ID | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| $ID_1$ | 0 | 1 | 0 | 1 | 0 | 1 | 0 | 1 | 0 | 1 | 0 | 1 | 0 | 1 | 0 | 1 |
| $ID_2$ | 0 | 0 | 1 | 1 | 0 | 0 | 1 | 1 | 0 | 0 | 1 | 1 | 0 | 0 | 1 | 1 |
| $ID_3$ | 0 | 0 | 0 | 0 | 1 | 1 | 1 | 1 | 0 | 0 | 0 | 0 | 1 | 1 | 1 | 1 |
| $ID_4$ | 0 | 0 | 0 | 0 | 0 | 0 | 0 | 0 | 1 | 1 | 1 | 1 | 1 | 1 | 1 | 1 |

FIG. 13

| $F_s$ | $F_s$ | $F_s$ | $F_s$ | m |
|---|---|---|---|---|
| $F_s$ | $F_s$ | $F_s$ | $F_s$ | $F_s$ |
| S | LPBA | LPBB | LPBC | m |
| $e_{k1}$ | $e_{k2}$ | $e_{k3}$ | $e_{k4}$ | $e_{k5}$ |

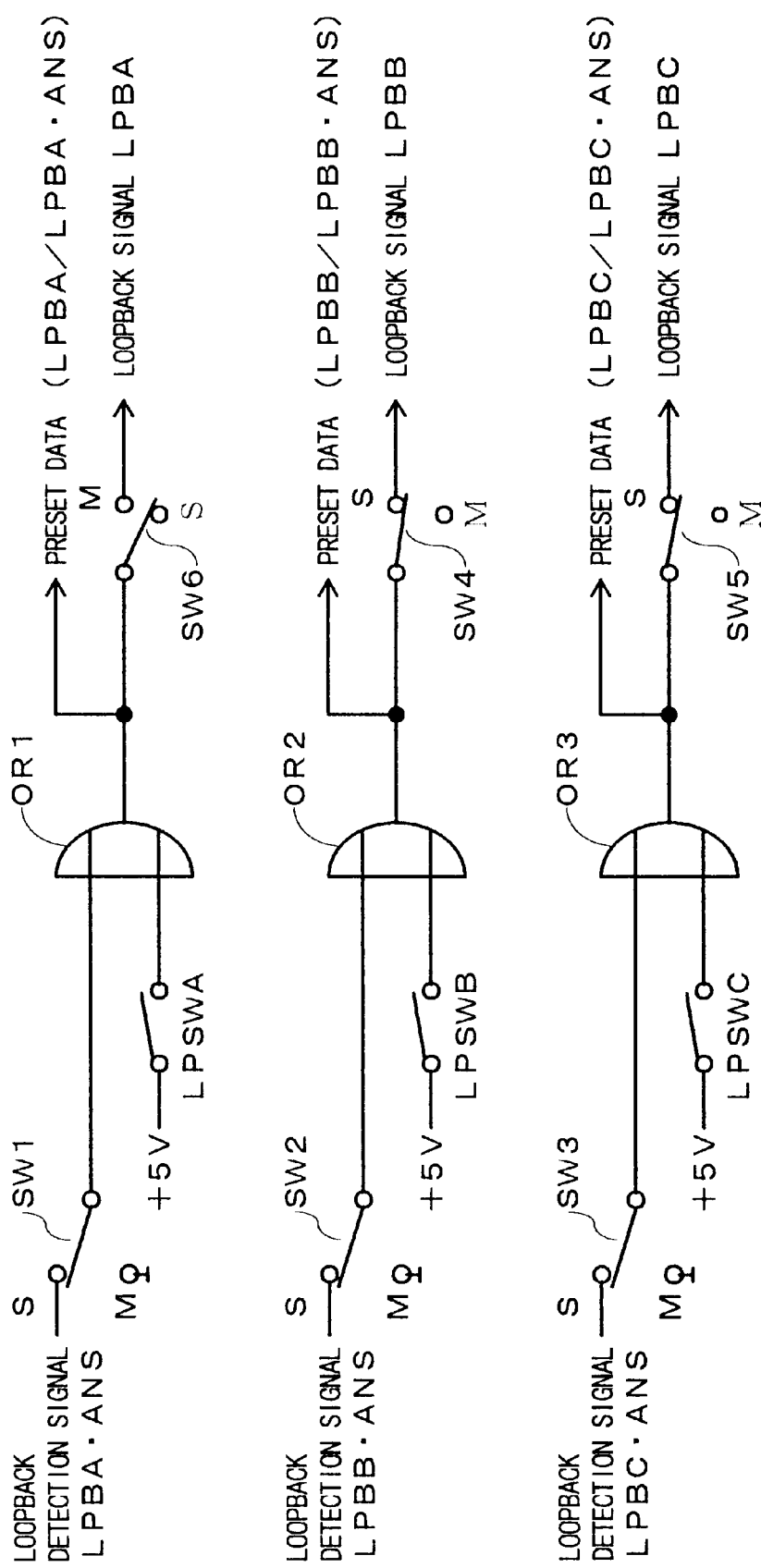

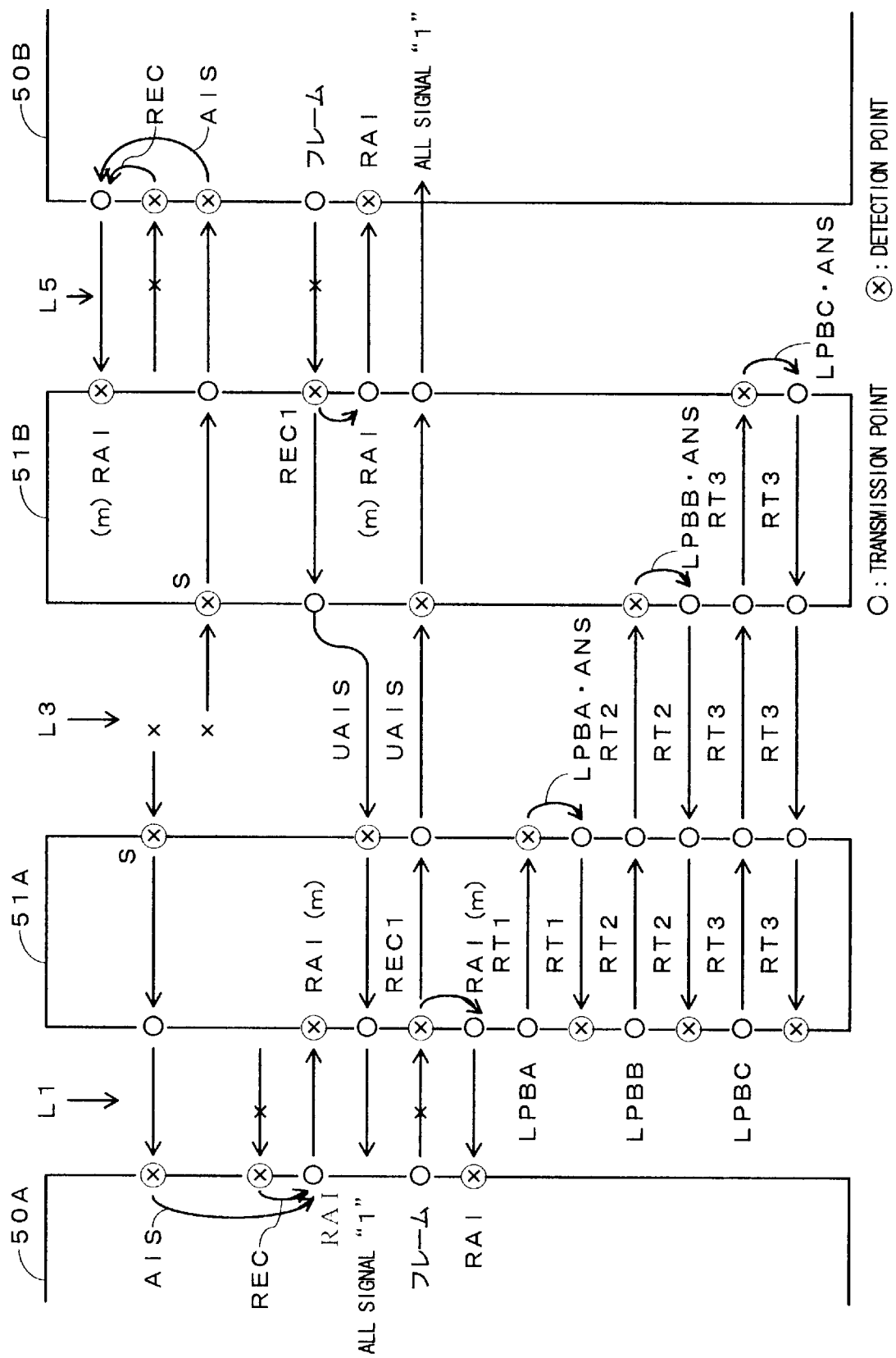

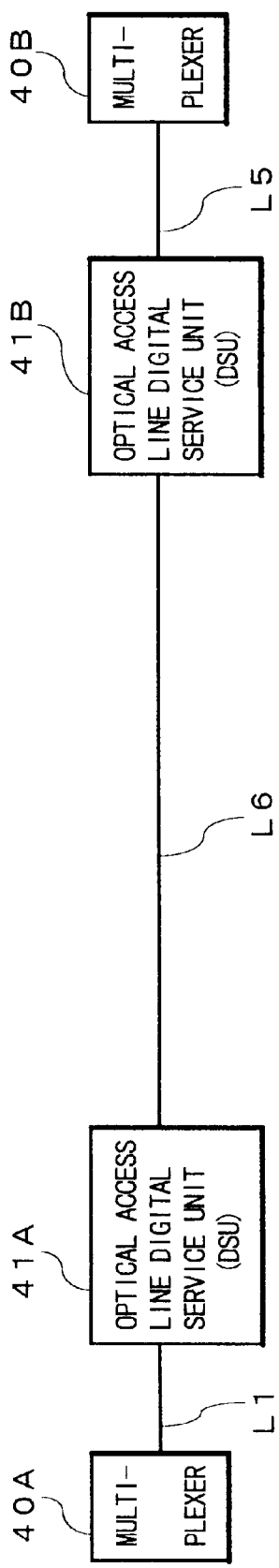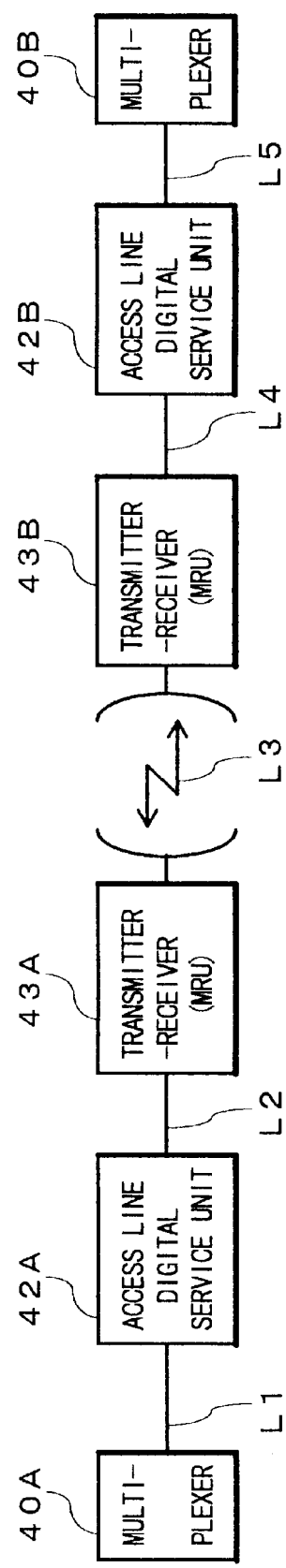

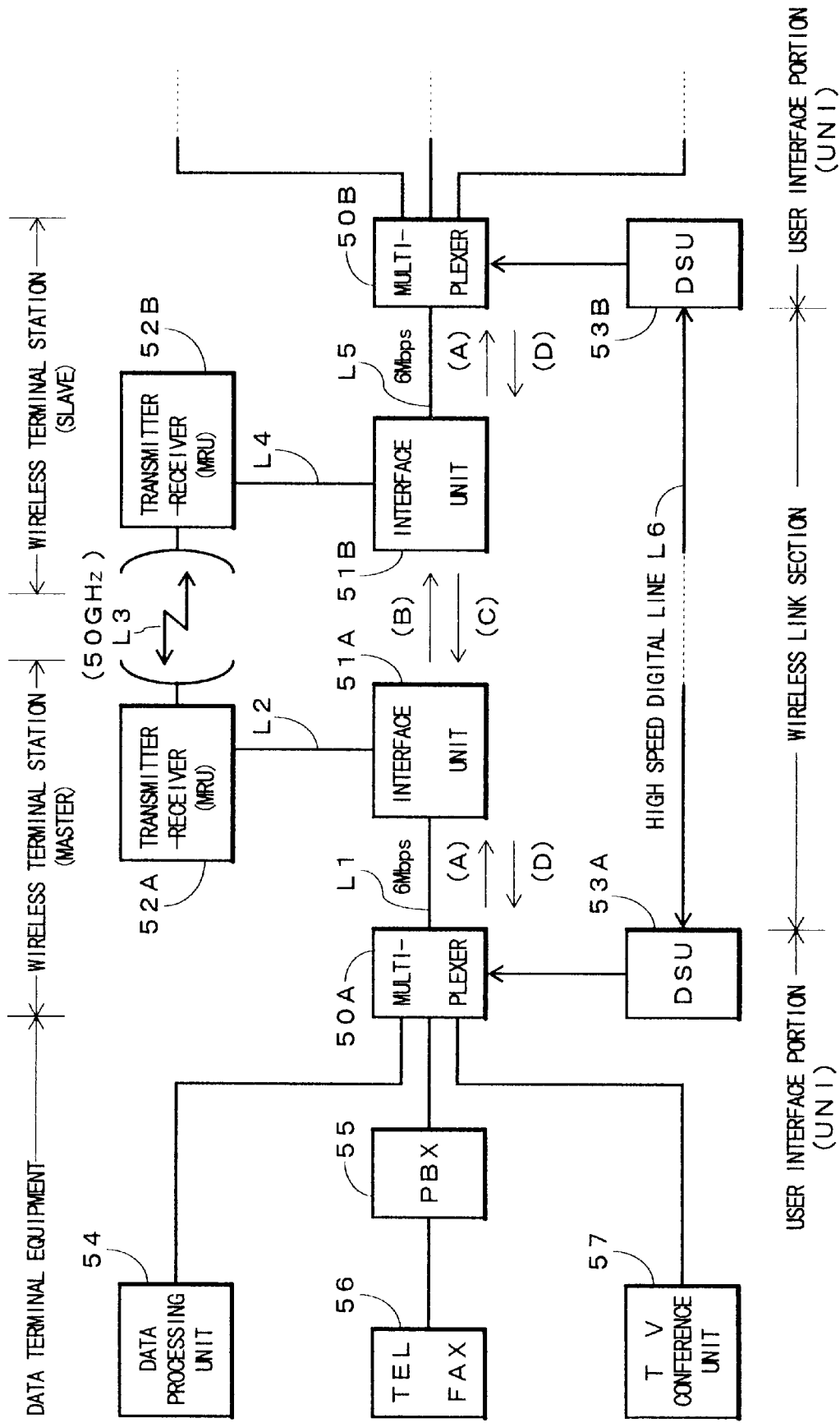

| | | | | CRV |
|---|---|---|---|---|
| — | — | — | — | — |
| — | — | S | — | — |
| — | — | — | — | — |

| F | F | F | CRV | P |
|---|---|---|---|---|
| I D | I D | I D | I D | P |
| — | UNR | S | — | P |
| — | — | — | — | P |

DIGITAL TRANSMISSION EQUIPMENT

BACKGROUND OF THE INVENTION

1. Field of the Invention

The present invention relates to a digital transmission equipment and in particular to an equipment which makes a digital signal transmission through a wireless communication link (radio communication link) in a digital transmission system.

2. Description of the Related Art

In such a digital transmission equipment, the information of voices, images, and data, etc. is digitized and multiplexed to a higher-order group digital signal which is transmitted to a communication link. This kind of equipment may use a method of transmission with a high-speed digital communication link through an access line (link) or with a wireless communication link of microwave or millimeter wave.

FIG. 9A shows a digital transmission equipment using the former method of transmission with a high-speed digital line.

As shown in the figure, this digital transmission equipment is composed of a multiplexer 40A and an optical access line digital service unit (abbreviated as DSU) 41A. The multiplexer 40A transmits a multiplexed digital signal of 6 Mbps to the digital service unit 4A which is supplied with a reference clock (not shown) for synchronization, and communicates with an optical access line digital service unit 41B and a multiplexer 40B in a digital transmission equipment as opposed through a transmission wired line (cable line) L6 which is a high-speed digital leased line.

Being generally used, this digital transmission equipment malfunctions when a failure occurs on the transmission wired line L6 for instance. Also, if a public or external access line is employed as the transmission line between near buildings or in a factory, an extra cost of communication expense will be required.

Then, a digital transmission equipment using the latter method of transmission with a wireless communication link L3 as shown in FIG. 9B has now been developed.

This digital transmission equipment is composed of a multiplexer 40A (40B), an access line digital service unit 42A (42B), and a transmitter-receiver (abbreviated as MRU) 42A (42B). The multiplexers 40A and 40B are connected to the access line digital service units 41A and 41B, through the transmission lines L1 and L5, respectively, which are connected to the transmitter-receivers 42A and 42B through transmission lines L2 and L4, respectively. The transmitter-receivers 42A and 42B are mutually connected through a wireless communication link L3.

Thus, the multiplexers 40A–40B are mutually connected by two parallel links between the transmitter-receivers 43A and 43B and the access line digital service units 41A and 41B whereby the failure thereof can be backed up and a private network of a large capacity can be constructed without using any other public access line.

In such a digital transmission equipment, a signal frame format used on the wireless communication link L3 is shown in FIG. 10. This frame is composed of frame synchronization bits (channel) $F_{SR}$ (3 octets), route (line) identification bits ID (4 bits) which specify a radio connection between opposed transmitter-receivers, an own terminal (DTE) state indication bit UAIS (or a state indication bit S) (1 bit), free bits (3 bits), loopback testing bits (3 bits) which contain bits LPBA-LPBC, data transfer bits $TS_1$–$TS_{98}$ (H channel+D channel+free channel) (98 octets), and CRC-5 check bits $e_{k1}$–$e_{k5}$ (5 bits) for the wireless signal frame. The speed is 6.592 Mbps.

In this wireless signal frame, the above-noted bits ID, UAIS/S and LPBA-LPBC can be referred to as "service information bits" which are transferred between transmission equipments for the purpose of supervision/maintenance. The synchronization bits $F_{SR}$ form an overhead of the wireless signal frame together with the service information bits ID, UAIS/S and LPBA-LPBC. The bits $TS_1$–$TS_{98}$ and $e_{k1}$–$e_{k5}$ are data bits which are extracted from the output signal of the multiplexers 40A and 40B and are mapped into the wireless signal frame which is to be transmitted via the wireless communication link L3.

Accordingly, in such a digital transmission equipment, unless a format conversion where a wireless signal frame is newly generated to add some bits is done, the bits ID, UAIS/S and LPBA-LPBC which are peculiar to the wireless communication link cannot be transferred. Therefore, there arises a problem of circuit arrangements being complicated and speed conversion circuits being required.

Thus, an equipment for digital signal transmission without newly adding a bit peculiar to the wireless communication link has been required.

As to the above-mentioned digital transmission equipment without requiring new addition of a bit peculiar to wireless communication link, the inventor of this invention (with a joint inventor) has already proposed same in the Japanese Patent Laid-open Publication No. 1-293031, as shown in a digital transmission system in FIG. 11.

In this prior art, the digital transmission system has a wireless link section formed by the division of a wireless terminal station as a digital transmission equipment into a master and a slave station provided with a reference clock signal (not shown) by the master station. The wireless terminal station in the master station includes a multiplexer 50A, an interface apparatus 51A which normally serves as an interface unit and is connected to the multiplexer 50A through the transmission line L1, and a transmitter receiver (MRU) 52A connected to the interface unit 51A through the transmission line L2. The wireless terminal station in the slave station connected via the wireless communication link L3 to the master station similarly includes a multiplexer 50B, an interface unit 51B connected to the multiplexer 50B through the transmission line L5, and a transmitter-receiver 52B connected to the interface unit 51A through the transmission line L4.

Also, in the wireless link section, the multiplexers 50A and 50B are connected through the optical access line digital service units 53A and 53B as well as the high speed leased line L6 (see FIG. 9A) which can be a protecting line for the wireless communication link L3 as a working link In addition the multiplexer 50A is connected to a data processing device 54, a telephone or facsimile receiver 56, and a television conference device 57 which form data terminal equipments, respectively. The telephone or facsimile receiver 56 is connected to the multiplexer 50A through PBX 55 (Private Branch exchange). The same arrangement applies to the multiplexer 50B, although not being shown in FIG. 11.

In this arrangement, the interface units 51A and 51B are substituted for the access line digital service units 42A and 42B in FIG. 9B, respectively. The interface units 51A and 51B interface the transmitter-receivers 52A, 52B with the multiplexers 50A, 50B, respectively when the opposed digital transmission equipments communicate with each other across the wireless link section.

Namely, an output signal from the data terminal equipments 54–57 is multiplexed e.g. by the multiplexer 50A of the master station, and is converted into a frame format called Y-interface specification which is the local (Japanese) standard as shown in FIG. 12.

This frame format has data transfer bits $TS_1$–$TS_{98}$ (98 bytes) and service information bit SF as shown in FIG. 12A. Similarly to the frame format in FIG. 10, for the purpose of supervision/maintenance between the transmission equipments, the service information bit SF includes 5 bits, in each of 4 continuous frames composing a superframe (multi-frame of 20 bits), which correspond to the CRC-5 check bits $e_{k1}$–$e_{k5}$ among the wireless signal frame shown in FIG. 10. The CRC-5 check bits $e_{k1}$–$e_{k5}$ in the form of the superframe include a bit CRV (frame synchronization bit) in the first frame and a bit S (state indication bit) in the third frame, respectively at a predetermined position, as shown in FIG. 12B. Other bits shown by "—" are not assigned for particular bits according to the Y-interface specification.

By the signal reception of this frame, the interface unit 51A produces a wireless signal frame.

In this wireless signal frame, the data transfer bits $TS_1$–$TS_{98}$ are not changed as shown in FIG. 12C. As for the service information bit SF, parity bits P are inserted in the tail of every frame, and route identification bits ID (4 bits) are inserted in the second (or fourth) frame of the superframe, for the quality supervision of the transmission line.

Besides, a signal F (FFF=111) of 3 bits is inserted to make a frame synchronization and the position where the bit CRV is inserted is changed for parity bits P. Also, a bit UNR which shows a failure occurrence up to this time point is inserted in a fixed position.

Synchronization for the wireless communication link is achieved for a frame of the Y-interface specification by allocating the above-mentioned service information bit SF into a superframe.

This frame is restored to the original frame format in the interface unit 51B after being transmitted to the transmitter-receiver 52B of the slave station opposed through the transmitter-receiver 52A and the wireless communication link L3, is separated into the data terminal equipment (not shown) through the multiplexer 50B and is transmitted. It is similar for the opposite direction from the slave to the master station.

The interface unit observes the service information bit SF in the frame having been transferred and measures the code error rate. When the code error rate exceeds a predetermined value, the interface unit generates an alarm signal. Also, by generating a test pattern during a test time the interface unit transmits the alarm signal based on the test results.

If the wireless signal frame according to the aforementioned Y-interface specification shown in FIG. 12B is realized with the I-interface specification which is now internationally demanded, it will be a frame composition shown in FIG. 13.

Specifically, four bits in the first frame in the superframe are allocated to synchronization bits $F_s$ in the wired signal frame, and one bit is allocated to a UNI (User Network Interface) maintenance signal bit m. In the second frame, all of the five bits are allocated to the synchronization bits $F_s$.

In the third frame, one bit is allocated to the state indication bit S between interface units, three bits to the loopback testing bits LPBA-LPBC, and one bit to the maintenance bit m, respectively. In the fourth last frame, the original CRC-5 check bits $e_{k1}$–$e_{k5}$ are allocated without any change.

Namely, in this wireless signal frame, the synchronization bits $F_s$ remain unchanged while other service information bits S and LPBA-LPBC are added. Recalculated CRC-5 check bits $e_{k1}$–$e_{k5}$ are substituted for the original check bits $e_1$–$e_5$ upon CRC operation incorporating the newly added service information bits mentioned above.

The bit positions for the bits S, LPBA-LPBC and m in the third frame are currently allocated as reserved bits X and a nonuse bit a (shown in the frame formats (A) and (D) of FIG. 1A) in the frame format of the I-interface specification for UNI (wired line).

For more effective state indication and maintenance of the wireless communication link, more service information bits such as line identification bits could advantageously be utilized.

However, no more reserved bits or nonuse bits are available in the I-interface specification. In addition, arbitrary use of the currently reserved or nonuse bits might cause inconvenience in the future because they may possibly be used for other purposes.

SUMMARY OF THE INVENTION

Accordingly, it is an object of the present invention to provide a digital transmission equipment connected between a transmitter-receiver for transmitting and receiving digital signals through a wireless communication link to and from an opposed interface apparatus and a multiplexer connected to a terminal equipment.

For the achievement of the above object, in a digital transmission equipment according to the present invention, the interface apparatus comprises; first means for receiving digital signals in a first frame format including a synchronization bit string from the multiplexer, synthesizing digital signals in a second frame format by replacing at least a portion of the synchronization bit string to service information bits for state indication and maintenance of the wireless communication link, and transmitting the digital signals synthesized in the second frame format to the transmitter-receiver; and second means for receiving digital signals in the second frame format from the opposed interface apparatus, restoring digital signals in the first frame format by replacing service information bits for status indication and maintenance of the wireless communication link, and transmitting the digital signals restored in the first frame format to the multiplexer.

The above-mentioned second means may comprise means for inserting a bit in a predetermined position of the service information bits to synchronize the wireless signal frame between the interface apparatuses.

Alternatively, the above-mentioned second means may comprise means for inserting a bit in a predetermined position of the service information bits to identify the wireless communication link.

Alternatively, the above-mentioned second means may comprise means for inserting a bit in a predetermined position of the service information bits to transfer a state of a multiplexer to an opposed multiplexer.

Alternatively, the above-mentioned second means may comprise means for inserting a loopback controlling bit in a predetermined position of the service information bits for the test of the I-interface specification, and the interface apparatus comprises means for generating therein the loopback controlling bit, means for detecting at least of one of the loopback controlling bit as generated and the loopback controlling bit from other interface apparatuses, and means for making a loopback control based on a detected result by the detection means.

In addition, the above-mentioned interface apparatus may comprise means for inserting a bit in a position of a bit for a wired line maintenance signal in the I-interface specification frame received from the multiplexer to identify a state of the line between the interface apparatuses.

Alternatively, the above-mentioned interface apparatus may comprise means for selecting one of the insertion of a state indication bit between the interface apparatuses in a position of a bit for the wired line maintenance signal and the transfer of the wired line maintenance signal bit without the insertion.

In another aspect of the present invention, a digital transmission system is also provided. This digital transmission system comprises a wired communication link for transmitting digital signals in a first frame format containing a synchronization bit string; a wireless communication link for transmitting digital signals in a second frame format containing service information bits for status indication and maintenance of the wireless communication link; and interface means for interconnecting said wired communication link and said wireless communication link by conversion between the first and second frame formats; said interface means replacing at least a part of the synchronization bit string with the service information bits, and vice versa to effect the conversion of the frame formats.

Also, the digital transmission system according to the present invention may comprise a first communication link for transmitting digital signals in a first frame format containing a synchronization bit string; a second communication link for transmitting digital signals in a second frame format containing service information bits for status indication and maintenance of the second communication link; and interface means for interconnecting said first communication link and said second communication link by conversion between the first and second frame formats; said interface means replacing at least a part of the synchronization bit string with the service information bits, and vice versa to effect the conversion of the frame formats.

Furthermore, the present invention may also provide an interface apparatus for digital transmission for connecting a wired communication link and a wireless communication link, the wired communication link transmitting digital signals in a first format containing a synchronization bit string, the wireless communication link transmitting digital signals in a second frame format containing service information bits for status indication and maintenance of the wireless communication link.

This interface apparatus comprises: means for synchronizing digital signals in the second frame format by replacing at least a part of the synchronization bit string contained in the digital signals in the first frame format received from the wired communication link with the service information bits and for transmitting the digital signals synthesized in the second frame format through the wireless communication link; and means for restoring digital signals in the first frame format by replacing the service information bits contained in the digital signals in the second frame format received from the wireless communication link with at least a part of the synchronization bit string and for transmitting the digital signals restored in the first frame format through the wired communication link.

Each means of the present invention as above-mentioned will be described in more detail with reference to the attached figures.

FIG. 1A shows a frame example transferred between the multiplexer and the interface apparatus/unit in a digital transmission equipment i.e. wireless terminal station previously shown in the digital transmission system in FIG. 11 which can also apply to the present invention.

The format of this frame shows the internationalized I-interface specification for wired line itself. The wireless communication link frame is composed of the service data transfer bits $TS_1$–$TS_{98}$ and the service information bits SF (5 bits) like the one in FIG. 12A. One superframe SPF is composed of four such frames.

That is, four bits are allocated to the synchronization bits $F_s$ and one bit is allocated to the bit m for the UNI maintenance signal (on the wired line) in the first frame in a superframe. In the second frame, the synchronization bits $F_s$ are allocated with five bits. In the third frame, three bits are allocated to the auxiliary bits X, one bit to the nonuse bit a, and another bit to the bit m for the UNI maintenance signal. As for the last fourth frame, five bits are allocated to CRC-5 check bits $e_1$–$e_5$ for UNI.

In the wired line frame based on the I-interface specification, the superframe SPF is converted into the wireless signal superframe SPF' as shown in FIG. 1B in the interface units 51A and 51B and then transferred from the transmitter-receiver (MRU) 52A and 52B to the wireless communication link L3.

It should be noticed that the frame synchronization bits $F_s$ (9 bits) in the frame formats (A) and (D) of the service information bit SF shown in FIG. 1A have a fixed pattern of "1" or "0". In the present invention frames flowing from the interface units 50A and 50B on the wireless communication link through the transmitter-receiver 52A and 52B are transferred without influencing the UNI data signal by service data peculiar to a wireless communication link being arranged in the frame synchronization bits $F_s$. In addition, homogeneous information bits are arranged in one frame of the superframe so that the equipment is simplified.

Specifically, a bit V indicating a wireless signal frame synchronization signal (CRV), loopback bits LPBA-LPBC, route identification bits $ID_1$–$ID_4$, and the own terminal state identification bits UAIS are allocated in the predetermined position shown of the synchronization bits $F_s$ in the first and second frames. The state indication bit S between the interface units is allocated at the position of the bit m.

Also, the bit m for the UNI maintenance signal in the third frame is set as "don't care". The fourth frame is allocated with the CRC-5 check bits $e_{k1}$–$e_{k5}$ for the wireless signal frame which are substantially the same as the CRC-5 check bits $e_1$–$e_5$ for UNI.

FIG. 2 shows a modified example of the frame format in FIG. 1A used for the present invention. In this modified frame example, the original maintenance bit m is substituted for the state indication bit S between the interface units in the frame formats (B) and (C) between the interface unit and the transmitter-receiver shown in FIG. 1B. The third frame is set in the same manner as the UNI frame formats (A) and (D) for a wired line shown in FIG. 2A.

In such a digital transmission equipment, the output signals from the data terminal equipments 54–57 are multiplexed by the multiplexer 50A as seen from FIG. 11 and are converted into the frame format (A) shown in FIG. 1A.

The signal converted into the frame format (A) is transferred to the interface unit 51A which converts it into the frame format (B). The signal converted into the frame format (B) is then transferred to the transmitter-receiver 52B opposed to the transmitter-receiver 52A through the wireless communication link L3. The signal of the frame format (B) is further converted into the frame format (D) by the interface unit 51B and separated to the data terminal equipments (not shown) through the multiplexer 50B.

In the same way, the signal transmission in the opposite direction can be made as follows: The frame format (A) from the multiplexer 50B is converted into the frame format (C) in the opposed interface unit 51A and transferred to the opposed interface unit 51A; The frame format (C) is then converted into the frame format (D) in the interface unit 51A for the multiplexer 50A.

Such frames have the same basic formats and require no speed conversion. Therefore, a speed conversion circuit when the wireless signal frame is produced becomes unnecessary, resulting in a simplified circuit.

Also, since the frame synchronization bits $F_s$ are fixed bits which can be easily produced in the interface units, any adverse effects are not caused on the frame synchronization signal to the multiplexer.

Moreover, since all of the service information bits (V, LPBA-LPBC, S, $ID_1$–$ID_4$, UAIS) for the above-mentioned wireless communication link can be arranged, the transfer of the state of the wireless communication link by the bit S and separate loopback tests at plural locations with loopback signals LPBA-LPBC become possible so that any failure can be easily detected. Also, an overreach of the wireless communication link and erroneous receptions from other stations at the same frequency can be prevented by the bits $ID_1$–$ID_4$. Furthermore, the state of terminal equipments of other stations can be identified by the bit UAIS.

Also, the extraction of the corresponding information bit can be facilitated because the bits LPBA-LPBC and $ID_1$–$ID_4$ can be arranged in the same, short frame.

In addition, the frame speed is identical with the bit speed in the multiplexer as mentioned above and bits other than the frame synchronization bits as well as the bit m are not influenced. A circuit for passing therethrough the output of the multiplexer is easily realized so that both of the above-mentioned transmission methods can be supported.

BRIEF DESCRIPTION OF THE DRAWINGS

FIG. 4 is a block diagram illustrating one embodiment of an ID-setter used for an interface unit of a digital transmission equipment according to the present invention;

FIG. 5 is a diagram illustrating one pattern of bits $ID_1$–$ID_4$ set by the ID-setter shown in FIG. 4;

FIG. 6 is a circuit diagram illustrating one embodiment of an LPB-controller used for an interface unit in a digital transmission equipment according to the present invention;

FIG. 7 is a block diagram illustrating transmission routes of various information bits used for a digital transmission equipment according to the present invention;

FIGS. 9A and 9B are block diagrams illustrating general arrangements of a digital transmission equipment;

FIG. 11 is a block diagram illustrating a digital transmission system including a digital transmission equipment common in arrangement to the prior art as well as the present invention;

FIG. 13 is a block diagram illustrating one example of service information bits of the I-interface specification frame.

Throughout the figures, the same reference numerals indicate identical or corresponding portions.

DESCRIPTION OF THE PREFERRED EMBODIMENTS

Figure 3:
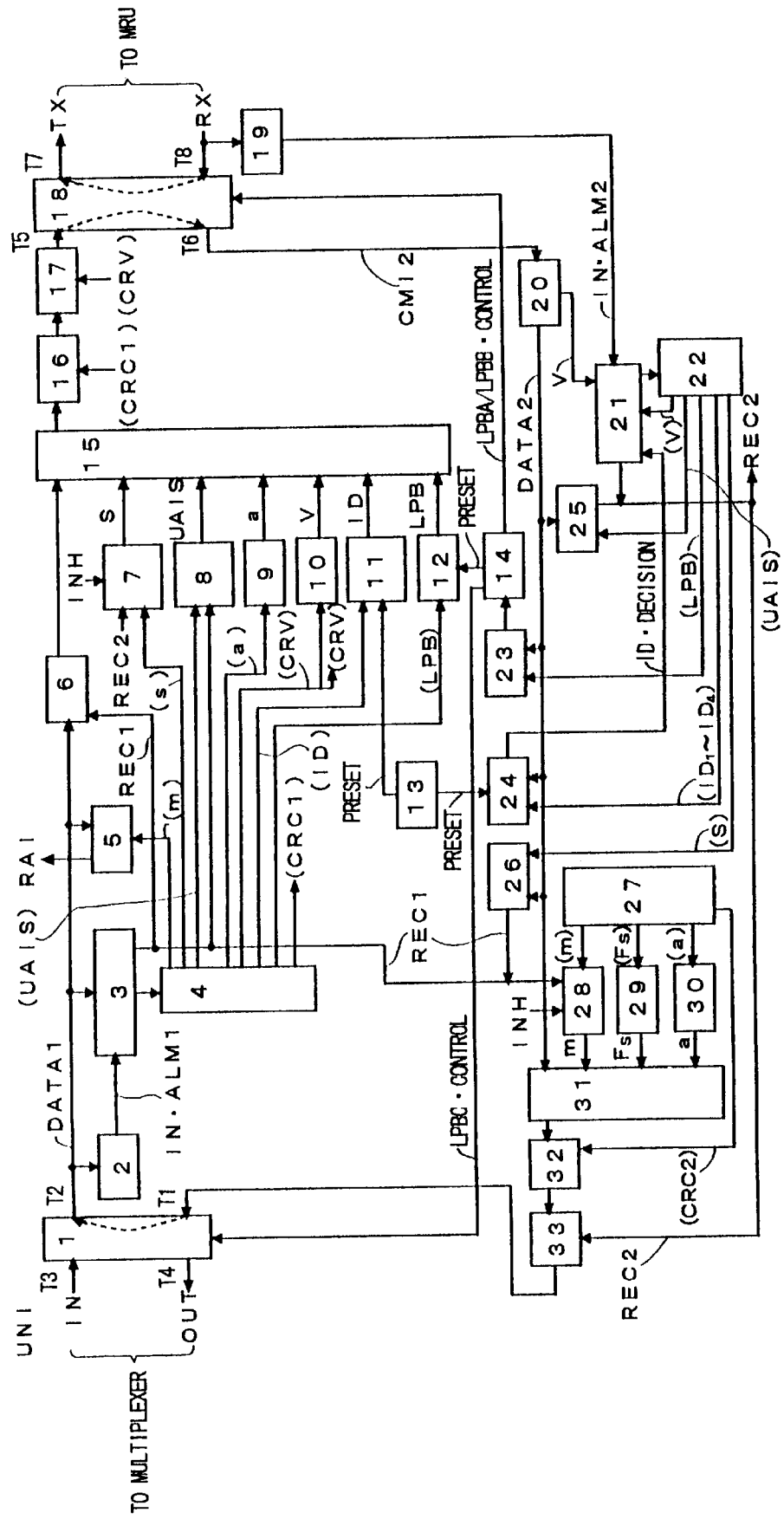
FIG. 3 is a block diagram illustrating one embodiment of an interface unit used for a digital transmission equipment according to the present invention.

FIG. 3 shows one embodiment of an interface apparatus normally serving as an interface unit used for a digital transmission equipment in a digital transmission system shown in FIG. 11 which is also applicable to the present invention. This interface unit is installed in the interface units 51A and 51B shown in FIG. 11.

Terminals T3 and T4 of a loopback device 1 are connected to the multiplexer 50A and 50B in FIG. 11. Describing the operation mainly on the frame format shown in FIG. 1A, data DATA1 from the multiplexer is usually forwarded from the terminal T3 to T2 of the loopback device 1. This data DATA1 has the frame format (A) of FIG 1A.

As for the data DATA1 which has passed the loopback device 1, the presence of the signal amplitude is judged by a disconnection detector 2. As a result, a disconnection indicating signal IN•ALM1 is set to "1" if there is no signal amplitude.

A frame synchronizer 3 detects the frame synchronization bits $F_s$ where the 1st frame is "1100" and the 2nd frame is "10100" of the bit string in the superframe SPF of the data DATA1. It is judged that the synchronization is achieved if the frame synchronization bits $F_s$ are detected and the disconnection indicating signal IN•ALM1 is not activated (actuated or asserted). At this time, a timing generator 4 generates various timing signals which correspond to the bits shown in the frame format (B) of FIG. 1B.

The frame synchronizer 3 activates a signal REC1 judging that it is an "abnormal state" if the frame synchronization bit $F_s$ is not detected or the disconnection indicating signal IN•ALM1 is activated.

An RAI-detector 5 observes the bit m in the data DATA1 at the timing of the bit m for the UNI maintenance signal from a timing generator 4 which synchronizes with the data DATA1. As a result, the RAI detector 5 deems it as a normal state if the repeated pattern of "1111111100000000" is detected and sets the signal RAI to "0". Otherwise, the RAI detector 5 deems it as an abnormal state and activates the signal RAI to "1".

Figure 2A:
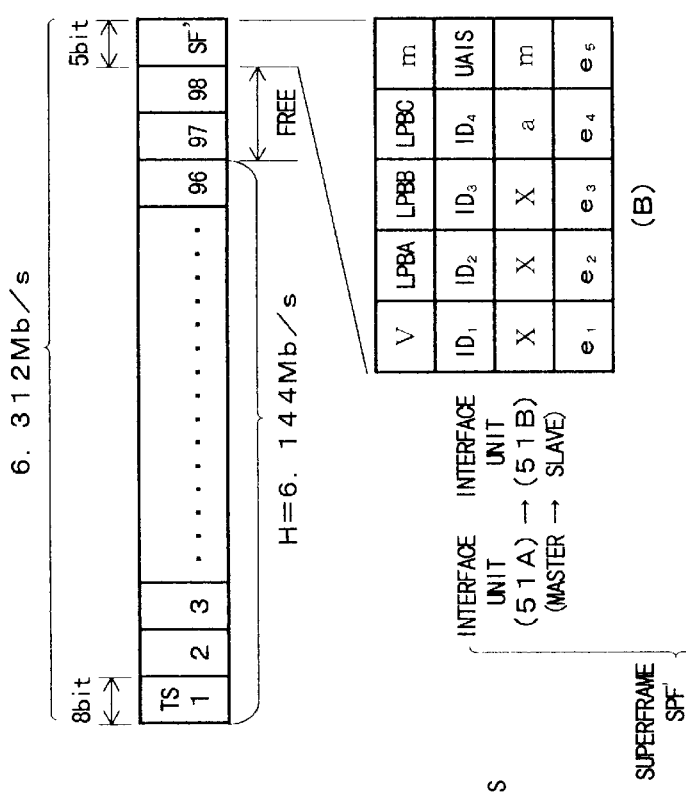
FIGS. 2A and 2B are block diagrams illustrating a second frame format used for a digital transmission equipment according to the present invention.

A signal INH is activated to "1" when the interface unit operates in the mode of the frame format of FIG. 2 whereby the activation of the signal RAI detected by the RAI detector 5 is invalidated.

A main signal all "1" generator 6 does nothing in the common state and passes the data DATA1 as it is. However, the generator 6 replaces all of the data DATA1 with "1", receiving the signal REC1 which indicates the activated state from the frame synchronizer 3 having detected asynchronous state.

At the timing of the state indication bit S between interface units from the timing generator 4, an S-inserter 7 observes a signal REC2 described later. The S-inserter 7 activates the bit S to "1" if the signal REC2 is activated, while if the signal INH is activated at this time the bit m (2 bits) in the data DATA1 is output as it is. If the signal REC2 is not activated, the S-inserter 7 does not activate the bit S.

A UAIS-inserter 8 observes the signal REC1 at the timing of the own terminal state identification bit UAIS from the timing generator 4. Resultantly, the bit UAIS is activated if the signal REC1 is being activated.

An a-inserter 9 makes a nonuse bit a "1" at the timing of the bit a from the timing generator 4.

A V-inserter 10 makes the wireless signal frame synchronization signal bit V "1" at the timing of the bit V from the timing generator 4.

At the timing of the bits $ID_1$–$ID_4$ from the timing generator 4, an ID-inserter 11 outputs a bit pattern set by an ID setter 13. An embodiment of this ID-setter 13 is shown in FIG. 4, and an embodiment of the ID pattern is shown in FIG. 5.

Specifically, this ID-setter 13 is composed of four switches IDSW1-IDSW4 and a shift register 130. Value "1" or "0" set by the switches IDSW1–IDS4W is shifted with clocks one after another as shown in the pattern of FIG. 5, and is output as the bits $ID_1$–$ID_4$.

At the timing of a bit LPB from the timing generator 4, an LPB-inserter 12 outputs the loopback signals LPBA-LPBC preset by an LPB-controller 14 as well as signals LPBA • ANS-LPBC • ANS received from the transmitter-receiver 52A and 52B (see FIG. 11) and detected by an LPB-detector 23.

An LPB-controller 14 is composed, as shown in FIG. 6, to contain master-slave changeover switches $SW_1$–$SW_5$, switches LPSWA–LPSWC, and logic sum gates OR1–OR3.

When the switches SW1–SW5 are changed over to the slave station, signals LPBA•ANS–LPBC•ANS detected by an LPB-detector 23 and the output signal logic "1" of each of the switches LPSWA–LPSWC is input to the gates OR1–OR3. After the logical summation in the gates OR1–OR3, the loopback signals LPBA-LPBC or the loopback detection signals LPBA•ANS-LPBC•ANS by switches LPSWA-LPSWC are output to a loopback device 1 or 18, respectively for the loopback control. In this case, the loopback signals LPBA–LPBC form presetting data for the LPB-inserter 12.

Also, the presetting data LPBA•ANS–LPBC•ANS with the switches LPSWA–LPSWC is output to the LPB-inserter 12 for the loopback control when the switches SW1–SW5 are changed over to the master station.

A synthesizer 15 synthesizes the output signals from the above-mentioned generator 6 and the inserters 7–12. This synthesized signal is subject to the CRC-5 operation given by a CRC calculator-inserter 16. The operation result is inserted in the CRC-5 check bits $e_{k1}$–$e_{k5}$ for the wireless signal frame at the timing of a signal CRC1 from the timing generator 4.

A CMI encoder 17 converts the data DATA1 of NRZ (Non-Return to Zero) signal from the CRC calculator-inserter 16 into that of a CMI signal. The CMI encoder 17 gives violation, which means the coding rule as to "1" in the CMI signal is forcibly violated only for the part of the wireless signal frame synchronization signal bit V, to the CMI signal at the timing of the bit V from the timing generator 4.

Figure 1B:
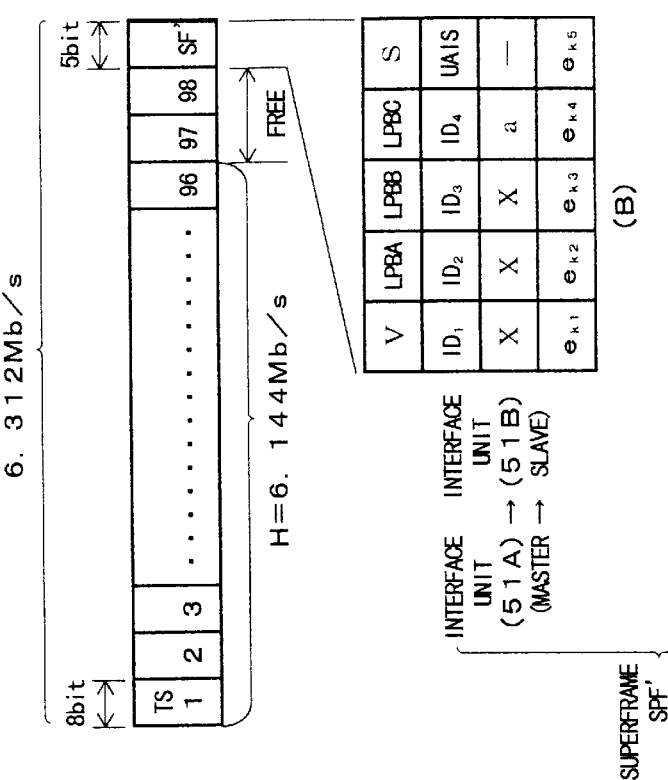
FIGS. 1A and 1B are block diagrams illustrating a first frame format used for a digital transmission equipment according to the present invention.

A loopback device 18 usually transfers the CMI-coded signal from the CMI encoder 17 having the frame format (B) in FIG. 1B to the transmitter-receiver 52A and 52B. However, when the loopback signal LPBA is provided by the LPB-controller 14, the loopback device 18 makes the signal loop back from the terminal T5 to the terminal T6 to receive it again as an input. When the loopback signal LPBB is provided by the LPB-controller 14, the loopback device 18 also makes the signals received from the tramsmitter-receivers 52A and 52B loop back from the terminal T7 to the terminal T8 to transfer it again to the transmitter-receivers 52A and 52B.

A signal RX in the slave station from the transmitter-receivers 52A and 52B connected to the terminals 17 and T8 of the loopback device 18 usually passes from the terminal T8 to T6 of the loopback device 18. The signal RX is converted by the CMI-decoder 20 from the CMI signal which has the frame format (B) shown in FIG. 1B into data DATA2 of NRZ signal. Also, CMI-decoder 20 detects the above-mentioned violation and activates the wireless signal frame synchronization bit V.

The received signal RX is judged regarding the presence of the signal amplitude in a disconnection detector 19. If the signal amplitude does not exceed the threshold value, a signal IN•ALM2 is activated.

A frame synchronizer 21 generates an ID decision signal deciding if the synchronization bit V detected by the CMI-decoder 20 is in the activated state, the signal IN•ALM2 is not in the activated state, and the bits $ID_1$–$ID_4$ detected by an ID-detector 24 are coincident with the route identification bit $ID_1$–$ID_4$ preset by the ID-setter 13. As a result, if the ID decision signal indicates the coincidence, the frame synchronizer 21 provides a control signal indicating that the synchronization is established for the timing generator 22 so that the timing generator 22 normally outputs various timing signals which respectively correspond to the bits of the frame format shown in FIG. 1.

Also, the frame synchronizer 21 activates a signal REC2 indicating that it is an abnormal state if the asynchronous state is activated or the signal IN•ALM2 is activated according to the bits V and $ID_1$–$ID_4$.

An LPB-detector 23 detects the sign LPBA-LPBC in the data DATA2 at the timing of the bits LPBA-LPBC which synchronizes with the data DATA2 from the timing generator 22 and transmits the information to the LPB-controller 14.

An ID-detector 24 detects the bit $ID_1$–$ID_4$ in the data DATA2 at the timing of the bits $ID_1$–$ID_4$ from the timing generator 22. After judging whether the bits $ID_1$–$ID_4$ are coincident with the bits $ID_1$–$ID_4$ set by the ID-setter 13, the ID-detector 24 transmits the above-mentioned ID decision signal to the frame synchronizer 21.

A UAIS-detector 25 detects the own terminal state identification bit UAIS in the data DATA2 at the timing of the bit UAIS from the timing generator 22. The UAIS detector 25 makes the signal REC2 "1" as the activated state judging that the opposed multiplexer is in an abnormal state if the bit UAIS is in the activated state.

An S-detector 26 detects the state indication bit S between the interface units in the DATA2 at the timing of the bit S from the timing generator 22. The S-detector 26 makes from the signal REC1 "1" as the activated state judging that the opposed interface unit is in an abnormal state if the bit S is in the activated state.

A timing generator 27 serves to generate various frame timing signals of the frame format (D) of FIG. 1.

An m-inserter 28 detects the signal REC1 indicating the abnormal state based on the bit S from the S-detector 26 or the signal REC1 from the frame synchronizer 3, at the timing of the bit m for the maintenance signal from the timing generator 27. If the signal REC1 indicates the abnormal state, the m-inserter 28 inserts the repeated pattern of "01111110" in the bit m to alarm the multiplexer the abormal state. On the other hand, if the signal REC1 indicates the normal state, the m-inserter 28 inserts the repeated pattern of "1111111100000000" in the bit m.

Figure 2B:
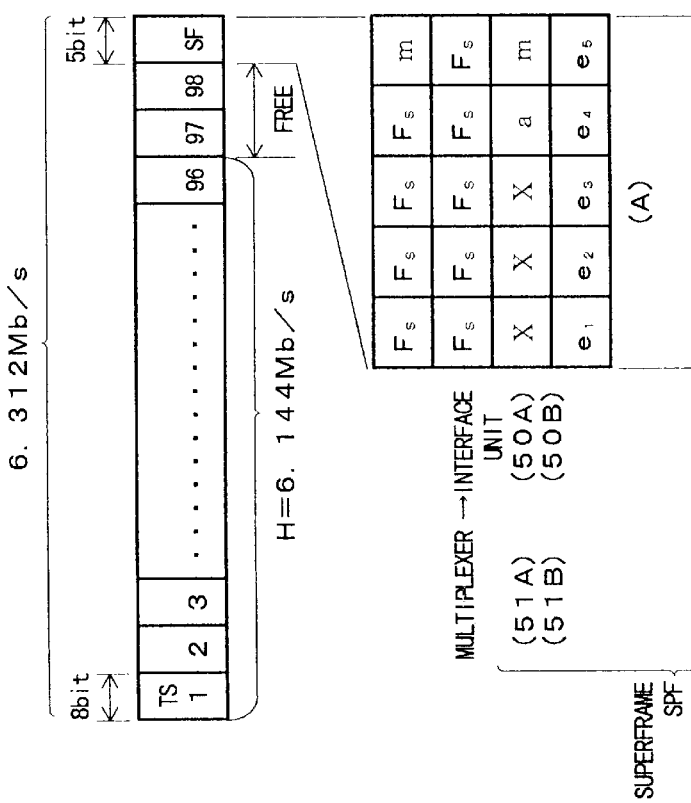

Since the mode switch signal INH is activated in case of the frame format shown in FIG. 2B the bit m is transferred as it is.

Figure 1A:
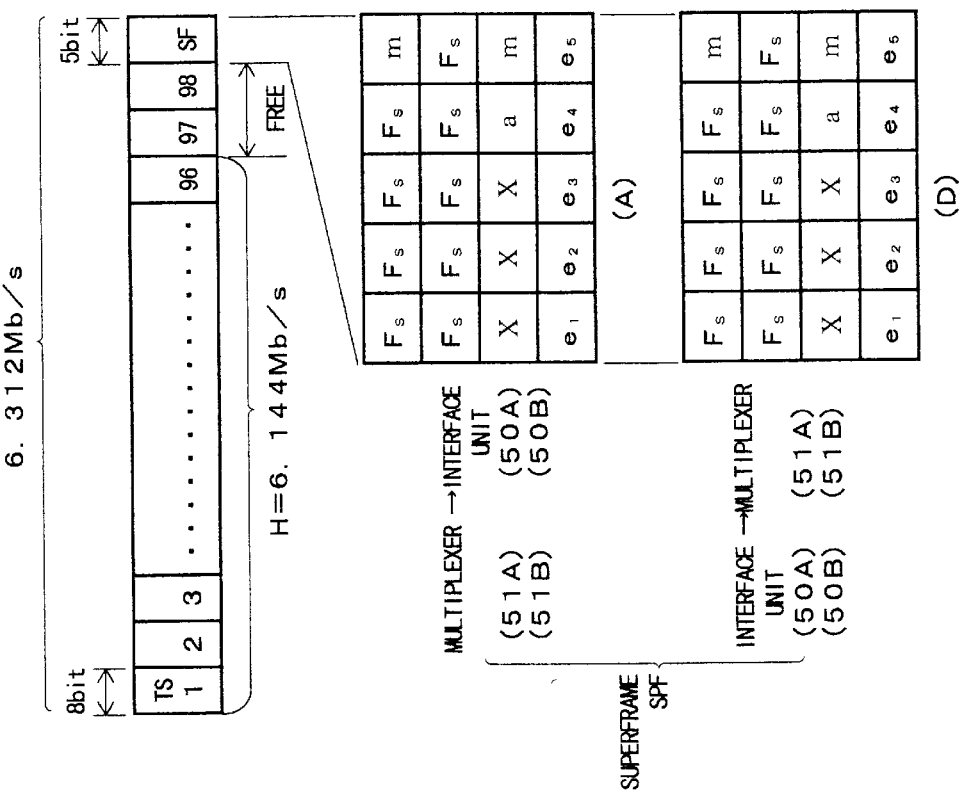

$F_s$-inserter 29 generates "110010100" which is the fixed frame pattern again for the multiplexer and transmits it at the timing of the frame synchronization bit $F_s$ in the frame format (D) of FIG. 1A from the timing generator 27.

An a-inserter 30 renders the nonuse bit a from the timing generator 27 to "1" at the timing of the bit a.

A synthesizer 31 synthesizes the signals $TS_1$–$TS_{98}$ from the CMI decoder 20, the auxiliary bit X, the bit m from the m-inserter 28, the bit $F_s$ from the $F_s$-inserter 29, and the bit a from the a-inserter 30.

A CRC calculator-inserter 32 performs the CRC-5 operation for the signal synthesized by the synthesizer 31, and inserts the result in the CRC-5 check bits $e_1$–$e_5$ for the UNI at the timing of CRC2 from the timing generator 27.

An AIS-generator 33 makes all signals "1" when the signal REC2 is activated according to the activated state or asynchronous state of the signal IN•ALM2 from the frame synchronizer 21 or the activated state of the bit UAIS from the UAIS-detector 25.

If the abnormal state is not found, the AIS-generator 33 transmits the signal which has the frame format (D) in FIG. 1A generated by the synthesizer 31 and the CRC calculator-inserter 32.

The signal as transmitted is transferred from the terminal T1 through the terminal T4 of the loopback device 1 to the multiplexer.

At this time, if the loopback control has been done this signal is looped back through the terminals T1 and T2 to the transmission station again.

It is to be noted that in FIG. 3, the components 1–18 schematically form the means for transmitting the synchronization bit string of the frame according to the I-interface specification received from the multiplexer through the transmitter-receiver to the opposed interface unit with the frame format allocated to the service information bit for the wireless communication link.

It is also to be noted that the components 19–33 schematically form the means for replacing the service information bits for the wireless communication link in the frame received from the opposed interface unit through the transmitter-receiver to the synchronization bits necessary to form the frame according to the I-interface specification and for transmitting it to the multiplexer.

Now will be described the frame format shown in FIG. 2. As mentioned above, according to this frame format the synthesizer 15 only keeps the bit m in the data DATA1 as it is by the mode switching signal INH, instead of the insertion of the bit S in the frame format in FIG. 1 and the bit of "don't care".

That is, only when the timing signal from the timing generator 4 indicates the bit S and "don't care", the data DATA1 is formed.

Also, the m-inserter 28 transmits the bit m as it is regardless of the signal REC1 from the S-detector 26 at the timing of the bit m for the maintenance signal from the timing generator 27, which is only different from the format of FIG. 1. Otherwise, those frame formats in FIGS. 1 and 2 are similar to each other.

The operation of the bits S and UAIS of the interface unit shown in FIG. 3 will be described referring to FIG. 7. When the wireless communication link L3 is disconnected, the state indication bit S between the interface units becomes "1" so that all main signals are made "1".

Simultaneously, the interface unit 51A transmits the AIS signal which has the frame format (D) having converted the bit S of the frame format (C) into the bit m for the UNI maintenance signal and the main signal of all "1" to the multiplexer 50A through the transmission line L1 to indicate the disconnection of the wireless communication link.

In the multiplexer 50A, when the AIS signal is transmitted to the interface unit 51A by setting the bit m in the frame format (A) to the pattern of the abnormal state, the signal RAI is activated by judging the pattern in the interface unit 51A.

Also, the disconnection of the transmission line L1 is detected with the signal REC by the multiplexer 50A. The signal REC is forwarded to the interface unit 51A with the bit m of the frame format (A). Therefore, the signal RAI is activated in the interface unit 51A.

Also, the same transmission can be made in the direction from the interface unit 51B to the multiplexer 50B to transmit the AIS signal indicating the wireless communication link disconnection to the multiplexer 50B.

In addition, when the signal of the frame format (A) from the opposed multiplexer 50B indicates the line disconnection, the frame synchronizer 3 detects it in the signal REC1 which is then converted into the bit UAIS in the interface unit 51B, that is, the main signal is all made "1". It is transmitted to the opposed interface unit 51A with the frame format (C), and then to the multiplexer 50A. The same transmission is made in the direction from the multiplexer 50A to the multiplexer 50B.

Figure 8:
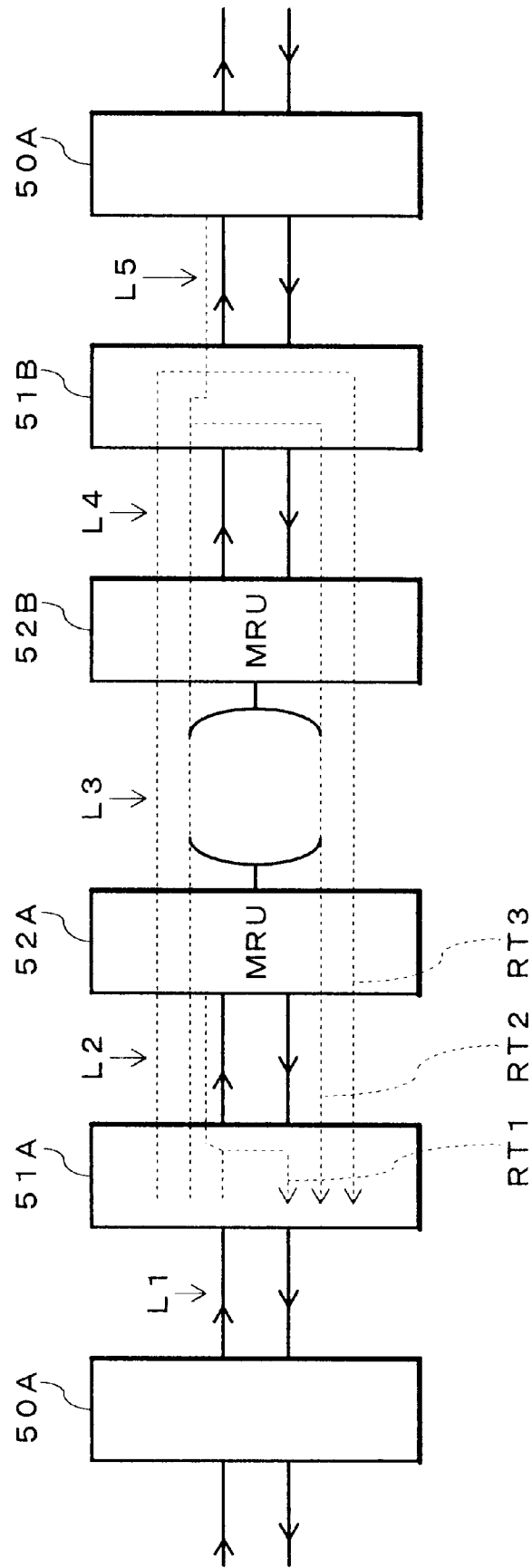
FIG. 8 is a block diagram illustrating routes of a loopback test in a digital transmission equipment according to the present invention.
Figure 10:
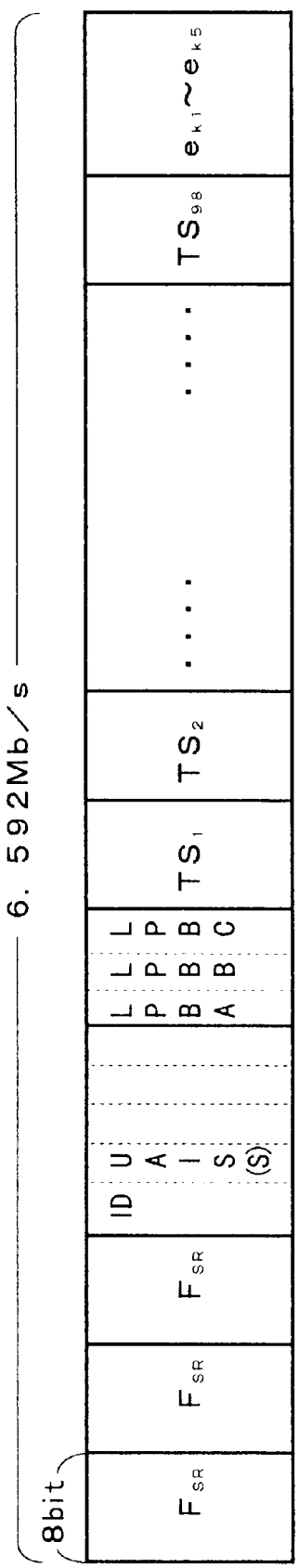
FIG. 10 is a block diagram illustrating one example of a conventional frame format for a wireless communication link.
Figures 12A, 12B, 12C:
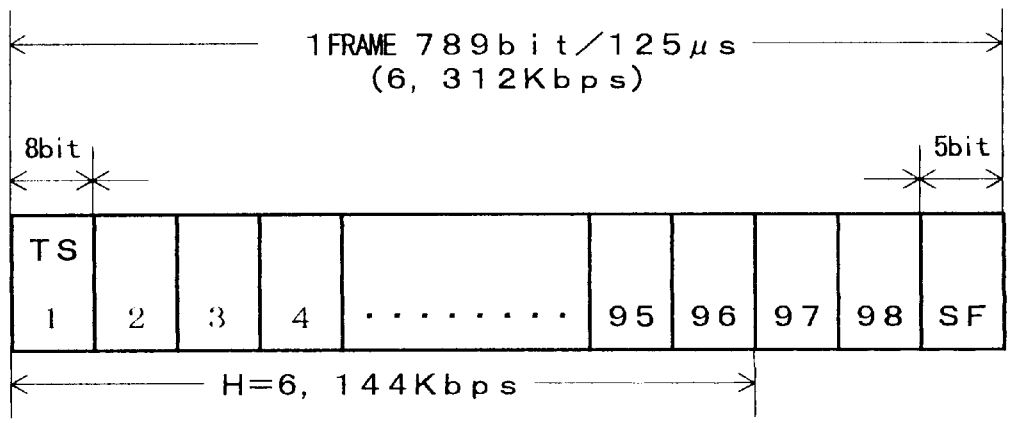
FIGS. 12A–12C are block diagrams illustrating a frame format according to the Y-interface specification.

The operation when the loopback test is performed will now be described referring to FIGS. 7 and 8.

RT1 shows a loopback route made with the information bit LPBA in the frame formats (C) and (D) of FIG. 1. That is, the LPB-controller 14 of the interface unit 51A makes a loopback control (LPBA control) through the terminals T5 and T6 to the loopback device 18 and presets the bit LPBA. As a result, all of the signal transmitted through the terminal T6 from the terminal T5 of the loopback device 18 are returned. Also, the bit LPBA is detected in the LPB-detector 23, and the detection signal is displayed in e.g. a display device (not shown) as the bit LPBA•ANS indicating that a loopback control is being processed.

RT2 shows another loopback route made by the information bit LPBB in FIG. 1. This information bit LPBB is transmitted from the interface unit 51A and is detected by the LPB-detector 23 in the opposed interface unit 51B. The loopback controller 14 controls the loopback device 18 according to the detection bit LPBB•ANS. As a result, the received signal RX is looped back from the terminal T8 to T7 for transmitting the information of the loopback control being processed to the interface unit 51A.

RT3 shows a further another loopback route between the interface units 51A–51B like the route RT2. However, the difference is that in the route RT3, the LPB-detector 23 detects the bit LPBC operating as the bits LPBC and LPBC•ANS and by controlling the loopback device 1 through the LPB-controller 14 the received signal is looped back from the terminal T1 to T2.

Thus, the loopback point is the exit or entrance of the interface unit 51A or 51B so that it is easily possible to determine whether a failure has occurred inside or outside the interface units.

Furthermore, the ID-setter 13 (see FIG. 4) of the interface unit 51A generates 16 kinds of patterns as shown in FIG. 5 by the bits $ID_1$–$ID_4$ to prevent a terminal station from mis-synchronizing with the signal received from other wireless terminal stations. These patterns are inserted in the bits $ID_1$–$ID_4$ of the frame format (B) of FIG. 1B, detected by the ID-detector 24 of the opposed interface unit 51B, and made coincident with the bits $ID_1$–$ID_4$ set by the interface unit 51B whereby important data is prevented from flowing out.

In this case, since the bits $ID_1$–$ID_4$ and four bits can be used, 16 kinds of patterns can be provided. Therefore, the outflow of important data can be prevented even if there are 16 separate lines.

If the signal from the multiplexer 50A is transmitted to the multiplexer 50B as it is, the frame formats (B) and (C) of FIG. 2 can be realized by activating the signal INH in the interface units 51A and 51B.

As described above, in a digital transmission equipment according to the present invention, an interface unit communicates with a multiplexer with the I-interface frame format and communicates with an interface unit opposed through a transmitter-receiver by the frame format in which the bit positions for the synchronization bit string in this frame format are allocated to service information bits for supervision of a wireless communication link. Therefore, without changing a basic format of the I-interface signal from the multiplexer, the service information bits peculiar to the wireless communication link can be arranged in the frame format so that the supervision or maintenance of the wireless terminal station can be secured and a failure can be easily found by the loopback function.

Also, erroneous signal receptions between wireless terminal stations can be protected and the notification of the state of opposed digital terminal equipments or opposed interface units is made possible.

Furthermore, a simple changeover operation becomes possible because no part is not influenced other than the frame synchronization bit when the signal of the multiplexer is transferred as it is.

I claim:

1. A digital transmission interface apparatus connected between a transmitter-receiver for transmitting and receiving digital signals through a wireless communication link to and from an opposed interface apparatus and a multiplexer connected to a terminal equipment, said interface apparatus comprising;

first means for receiving digital signals in a first frame format including a synchronization bit string from the multiplexer, synthesizing digital signals in a second frame format by replacing at least a portion of the synchronization bit string to service information bits for state indication and maintenance of the wireless communication link, and transmitting the digital signals synthesized in the second frame format to the transmitter-receiver; and second means for receiving digital signals in the second frame format from the opposed interface apparatus, restoring digital signals in the first frame format by replacing service information bits for status indication and maintenance of the wireless communication link, and transmitting the digital signals restored in the first frame format to the multiplexer.

2. A digital transmission interface apparatus as claimed in claim 1 wherein the second means comprises means for inserting a bit in a predetermined position of the service information bit to synchronize the wireless signal frame between the interface apparatuses.

3. A digital transmission interface apparatus as claimed in claim 1 wherein the second means comprises means for inserting a bit in a predetermined position of the service information bit to identify the wireless communication link.

4. A digital transmission interface apparatus as claimed in claim 1 wherein the second means comprises means for inserting a bit in a predetermined position of the service information bit to transfer a state of a multiplexer to an opposed multiplexer.

5. A digital transmission interface apparatus as claimed in claim 1 wherein the second means comprises means for inserting a loopback controlling bit in a predetermined position of the service information bit for the test of the I-interface specification, and the interface apparatus comprises means for generating therein the loopback controlling bit, means for detecting at least of one of the loopback controlling bit as generated and the loopback controlling bit from other interface apparatuses, and means for making a loopback control based on a detected result by the detection means.

6. A digital transmission interface apparatus as claimed in claim 1 wherein the interface apparatus comprises means for inserting a bit in a position of a bit for a wired line maintenance signal in the I-interface specification frame received from the multiplexer to identify a state of the line between the interface apparatuses.

7. A digital transmission interface apparatus as claimed in claim 6 wherein the interface apparatus comprises means for selecting one of the insertion of a state indication bit between the interface apparatuses in a position of a bit for the wired line maintenance signal and the transfer of the wired line maintenance signal bit without the insertion.

8. A digital transmission system comprising:

a wired communication link for transmitting digital signals in a first frame format containing a synchronization bit string;

a wireless communication link for transmitting digital signals in a second frame format containing service information bits for status indication and maintenance of the wireless communication link; and interface means for interconnecting the wired communication link and the wireless communication link by conversion between the first and second frame formats;

the interface replacing at least a part of the synchronization bit string with the service information bits, and vice versa to effect the conversion of the frame formats.

9. A digital transmission system comprising:

a first communication link for transmitting digital signals in a first frame format containing a synchronization bit string;

a second communication link for transmitting digital signals in a second frame format containing service information bits for status indication and maintenance of the second communication link; and interface means for interconnecting the first communication link and the second communication link by conversion between the first and second frame formats;

the interface means replacing at least a part of the synchronization bit string with the service information bits, and vice versa to effect the conversion of the frame formats.

10. An interface apparatus for digital transmission for connecting a wired communication link and a wireless communication link, the wired communication link transmitting digital signals in a first format containing a synchronization bit string, the wireless communication link transmitting digital signals in a second frame format containing service information bits for status indication and maintenance of the wireless communication link, said interface apparatus comprising:

means for synchronizing digital signals in the second frame format by replacing at least a part of the synchronization bit string contained in the digital signals in the first frame format received from the wired communication link with the service information bits and for transmitting the digital signals synthesized in the second frame format through the wireless communication link; and means for restoring digital signals in the first frame format by replacing the service information bits contained in the digital signals in the second frame format received from the wireless communication link with at least a part of the synchronization bit string and for transmitting the digital signals restored in the first frame format through the wired communication link.

* * * * *